US009536377B2

(12) United States Patent
Hollander et al.

(10) Patent No.: US 9,536,377 B2
(45) Date of Patent: Jan. 3, 2017

(54) REMOVABLE MODULE AND ADAPTER FOR ELECTRONIC GAMING MACHINE AND ASSOCIATED METHODS

(71) Applicant: WMS Gaming, Inc., Waukegan, IL (US)

(72) Inventors: Evan Hollander, Buffalo Grove, IL (US); Scot W. Salzman, Buffalo Grove, IL (US); Aaron W. Levinsky, Park Ridge, IL (US)

(73) Assignee: WMS GAMING, INC., Waukegan, IL (US)

( * ) Notice: Subject to any disclaimer, the term of this patent is extended or adjusted under 35 U.S.C. 154(b) by 334 days.

(21) Appl. No.: 14/324,936

(22) Filed: Jul. 7, 2014

(65) Prior Publication Data

US 2015/0018104 A1 Jan. 15, 2015

Related U.S. Application Data

(60) Provisional application No. 61/845,504, filed on Jul. 12, 2013.

(51) Int. Cl.
*G06F 3/01* (2006.01)
*G07F 17/32* (2006.01)

(52) U.S. Cl.
CPC ....... *G07F 17/3223* (2013.01); *G07F 17/3202* (2013.01); *Y10T 29/49002* (2015.01)

(58) Field of Classification Search
None
See application file for complete search history.

(56) References Cited

U.S. PATENT DOCUMENTS

| | | | |
|---|---|---|---|
| 7,637,816 B2 | 12/2009 | Canterbury | |
| 8,226,473 B2 | 7/2012 | Gazdic et al. | |
| 8,282,477 B2 | 10/2012 | Dasgupta | |
| 8,317,611 B2 * | 11/2012 | Sitrick | B05B 15/001 463/31 |
| 2010/0048296 A1 | 2/2010 | Adiraju | |
| 2012/0208619 A1 | 8/2012 | Canterbury | |
| 2012/0208633 A1 * | 8/2012 | Salzman | G06F 21/572 463/29 |

* cited by examiner

*Primary Examiner* — Cheng-Yuan Tseng
(74) *Attorney, Agent, or Firm* — Miller, Matthias & Hull LLP

(57) ABSTRACT

An electronic gaming machine has memory components configured for easy removal during programming or validation procedures. A module may carry first and second memory devices on a module board having a module connector configured to removably attach to a baseboard carrying a processor. Accordingly, multiple memory devices may be removed and reinstalled together as a unit. An adapter may be provided to allow connection of the module to an interface device having a standard interface connector. The module may also provide status information regarding the execution of code stored on one or more of the memory devices.

20 Claims, 10 Drawing Sheets

REMOVABLE MODULE AND ADAPTER FOR ELECTRONIC GAMING MACHINE AND ASSOCIATED METHODS

CROSS-REFERENCE TO RELATED APPLICATION

This application claims the benefit of U.S. Provisional Application Ser. No. 61/845,504, filed Jul. 12, 2013. The patent application identified above is incorporated here by reference in its entirety to provide continuity of disclosure.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2013, WMS Gaming, Inc.

FIELD OF THE DISCLOSURE

The present disclosure relates generally to gaming systems and methods, and more particularly to systems and methods for programming and validating code provided on memory components of an electronic gaming machine.

BACKGROUND OF THE DISCLOSURE

Electronic gaming machines (EGMs), such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

EGMs have provided a welcome reliability and ease of use to the world of gaming, enabling both the operator and the players to enjoy a more seamless and extended experience. However, with the advent of EGMs, certain problems not heretofore presented have become commonplace. For example, an EGM is typically based on a computing device having a processor for receiving and providing inputs and outputs respectively, as well as a computer-readable medium for storing process variables, instructions, and parameters. Consequently, an adverse event that would not affect a mechanical gaming machine may well compromise the performance or security of an EGM. Similarly, an ill-intentioned person may seek to misdirect the operation of the processor in order to generate personal gain, e.g., by changing odds, causing a payout when none was earned and so on.

In view of the foregoing, authentication and validation procedures may be used to ensure the integrity of the code that is run by the EGM. These processes may be used not only to identify when performance has been inadvertently or intentionally compromised, but also may be required to occur at certain points during the life of the EGM by the jurisdiction in which the EGM is located. For example, validation may performed during EGM production, when the EGM is first installed at a location, when a large payout has been triggered, or other occasions when a validation may be required or desired. The memory components to be validated may include boot up and initialization instructions such as a Basic Input Output System (BIOS) data, user BIOS extension (UBE) loader data for loading specific game code, and jurisdictional data regarding the jurisdictional requirements where the EGM is located.

In conventional EGMs, the memory components to be validated are typically provided as modules that are embedded on the baseboard of the EGM. Due to the location of the baseboard within a CPU box, security enclosure, and cabinet door, however, it is relatively difficult to access these components while the baseboard is mounted in the EGM, and therefore validation typically requires the entire CPU to be pulled from the EGM. More recently, removable BIOS and jurisdiction modules have been used that allow the CPU to remain in place while only the components to be validated may be removed. The relatively small size and hard to reach location of these modules, however, complicate removal and reinstallation. Additionally, these modules have used relatively fragile pin connectors that are easily bent or damaged. Consequently, the current BIOS and jurisdiction modules are frequently broken during field operations, necessitating replacement and causing excessive downtime for the EGM.

SUMMARY OF THE DISCLOSURE

According to one aspect of the present disclosure, a method of interfacing with memory contents associated with an electronic gaming machine by an interface device includes coupling an adapter to the interface device, the adapter including an adapter switch having at least a first state and a second state. A module is coupled to the adapter, the module including a first device having a first memory for storing a first set of data associated with the electronic gaming machine, and a second device having a second memory for storing a second set of data associated with the electronic gaming machine. The adapter switch is placed in the first state to communicatively couple the first device to the interface device and the first memory is accessed using the interface device. The adapter switch is then placed in the second state to communicatively couple the second device to the interface device and the second memory is accessed using the interface device.

According to another aspect of the present disclosure, which may be combined with any of the other aspects disclosed herein, a module is provided that is accessible by an interface device and has memory contents associated with an electronic gaming machine configured to execute a wagering game. The module includes a module board, a first device coupled to the module board and having a first memory configured to store a first set of data associated with the wagering game, a second device coupled to the module board and having a second memory configured to store a second set of data associated with the wagering game, and a module connector coupled to the module board and configured for removable coupling to the interface device, the module connector having a first module contact communicatively coupled to the first device and a second module contact communicatively coupled to the second device.

According to another aspect of the present disclosure, which may be combined with any of the other aspects disclosed herein, a module assembly is provided for coupling an interface device having an interface connector to memory contents associated with a baseboard of an electronic gaming machine, the electronic gaming machine having a processor communicatively coupled to a baseboard connector. The module assembly includes a module having a module board, a first device coupled to the module board and having a first memory configured to store a first set of data associated with the electronic gaming machine, a second device coupled to the module board and having a second memory configured to store a second set of data associated with the electronic gaming machine, and a module connector coupled to the module board and configured for removable attachment to the baseboard connector, the module connector having a first module contact communicatively coupled to the first device and a second module contact communicatively coupled to the second device. The module assembly further includes an adapter having an adapter input connector configured to engage the module connector and including a first adapter input contact configured to engage the first module contact and a second adapter input contact configured to engage the second module contact, an adapter output connector configured to engage the interface connector, and a switch having a first position, in which the first adapter input contact is communicatively coupled to the output connector, and a second position, in which the second adapter input contact is communicatively coupled to the output connector.

According to another aspect of the present disclosure, which may be combined with any of the other aspects disclosed herein, an electronic gaming machine configured to execute a wagering game may include a baseboard, a processor located on the baseboard, a first device operatively coupled to the processor and having a first memory configured to store BIOS code associated with the wagering game, and a status indicator operably coupled to the first memory and configured to display status information associated with the first memory

Figure 1:
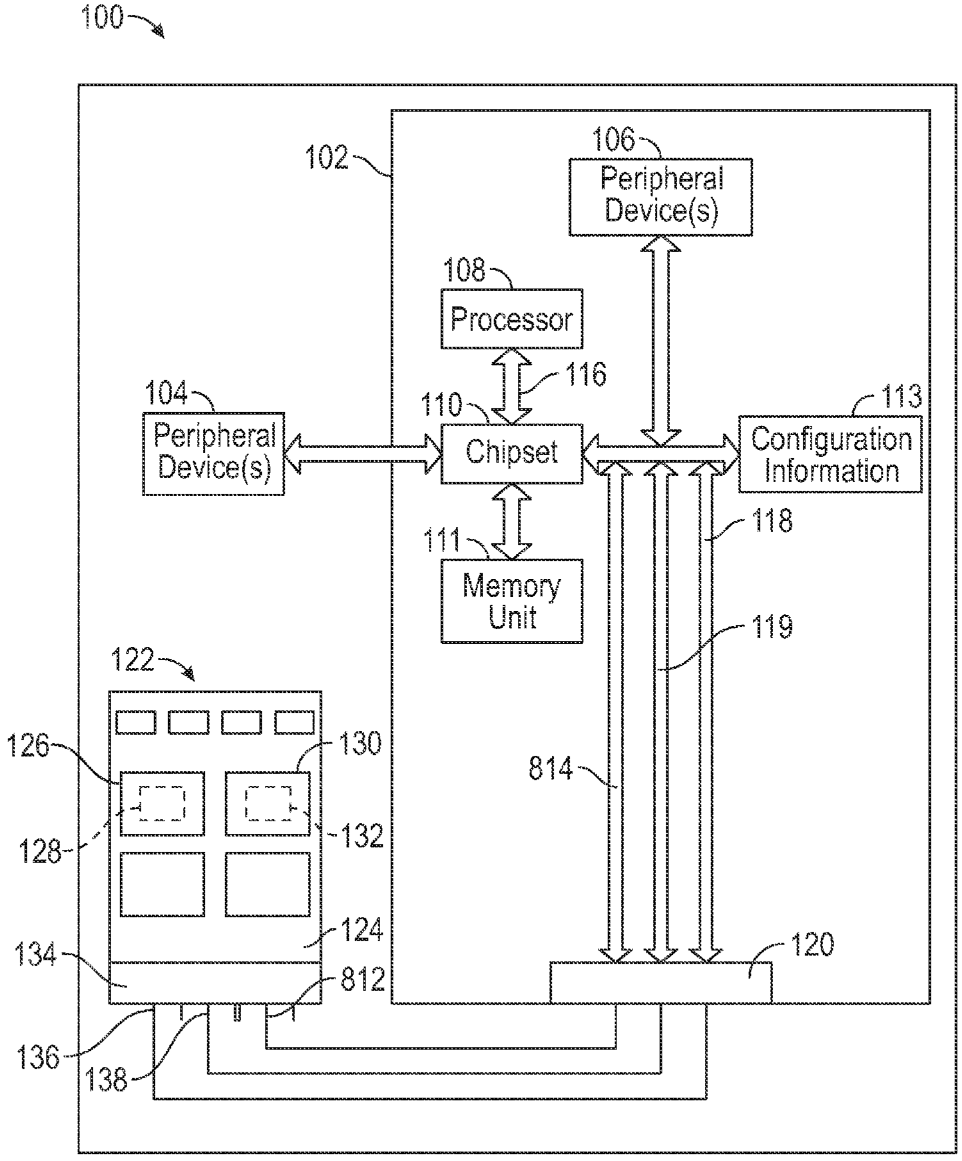
FIG. 1 is a block diagram that illustrates a computer architecture according to exemplary embodiments of this disclosure.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the appended claims.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts. While the present disclosure may be embodied in many different forms, the embodiments set forth in the present disclosure are to be considered as exemplifications of the principles of the present disclosure and are not intended to be limited to the embodiments illustrated. For purposes of the present detailed description, the singular includes the plural and vice versa (unless specifically disclaimed); the words “and” and “or” shall be both conjunctive and disjunctive; the word “all” means “any and all”; the word “any” means “any and all”; and the word “including” means “including without limitation.”

Electronic gaming machines (EGMs) within which the disclosed principles may be implemented include standalone machines, back-to-back machines, side-by-side machines and other configurations that may be selected for practicality or convenience, whether portable or nonportable. As used herein, the term EGM will encompass all such variants, although the examples given are limited to single stand-alone machines for ease of explanation. Moreover, the game or type of game played on the EGM is not important. Possible games include, but are not limited to, video poker, video slots, video blackjack, video bingo, video keno, video roulette, video baseball, video lottery, Class 3 games, and others.

EGMs may include memory contents used to operate a wagering game. For example, a nonvolatile memory may store basic input output system (BIOS) code that may include a system BIOS and a user BIOS extension (UBE). The UBE may be executed as part of the boot up operations along with the system BIOS. The BIOS code stored in the nonvolatile memory may be write-protected to prevent the code from being modified, deleted, hacked, etc. Additionally, the EGM may include a nonvolatile memory that stores jurisdictional code that conforms the wagering game to geographical or legal requirements. Accordingly, the jurisdictional code may relate to the language, pay table ranges, or other information that is particular to the specific location in which the EGM is located.

The nonvolatile memory devices may reside on a baseboard (also known as a motherboard, system printed circuit board, carrier board, main board, etc.). In some example embodiments, the nonvolatile memory devices are configured to couple with a connector associated with the baseboard. Also, the nonvolatile memory devices may be removed from the connector for independent validation of the data stored therein. For example, the nonvolatile memory devices may be placed in an interface device, such as a verification device (e.g., devices manufactured by Kobetron Inc. of Navarre, Fla., Gaming Laboratories International Inc. (GLI) of Toms River, N.J., Dataman Programmer Ltd. of Orange City, Fla., etc.). The verification device can then produce a digital signature based on the data that is stored therein. This device can compare the digital signature to a known valid digital signature. Once validated, the BIOS and jurisdictional code stored therein can be considered the beginning of a chain of trust.

Validation by a verification device can occur at different times. For example, the validation can occur when the computer is initially installed, at different times while the computer is in the field, etc. For example, for electronic gaming machines, gaming regulations require validation during the initial installation at a wagering game establishment. Thus, a technician may manually remove the nonvolatile memory and authenticate the BIOS and jurisdictional code. In another example, validation can be required after a certain level of win—"a big win." A big win can be defined relative to any monetary amount and can vary between different types of EGMs. For example, a big win on EGM A can be $10,000, and a big win on EGM B can be $25,000. Validation after a big win can help ensure that no person or program has tampered with or altered this chain of trust in the EGM to illegally obtain the win.

The chain of trust can continue during the boot operations. While an EGM boots-up, as part of the execution of the UBE, the processor validates both the system BIOS and the UBE stored in the nonvolatile memory. Such validation can include generating a digital signature over the BIOS code and then validating the generated digital signature to ensure that the BIOS code has not been modified. Also in the chain of trust, as part of the execution of the UBE, the processor validates the bootable device (e.g., compact FLASH, hard disk drive, solid state drive, Universal Serial Bus (USB) flash drive, etc.).

In the wagering game industry, gaming regulations require that the nonvolatile memory that stores BIOS code be independently validated using a verification device (e.g., a device manufactured by Kobetron Inc. of Navarre, Fla.). The manner in which validation is performed may vary depending on the configuration of the computer architecture. In general, the processor and chipset may be on a Computer on Module Express (COMe) that is mounted on the carrier board. In conventional EGMs, the nonvolatile memory storing the BIOS code may be embedded or otherwise mounted directly on the baseboard. Validation of the device storing the BIOS code typically required direct handling of the memory device or, alternatively, removal of the entire carrier board from the EGM. More recently, individual BIOS and jurisdictional modules have been used that independently plug into sockets provided on the baseboard, thereby allowing the baseboard to remain in place while the individual memory modules were removed for authentication. Each of these modules are handled separately, thereby necessitating duplicate steps to authenticate both the BIOS and the jurisdictional code. Additionally, the devices used fragile pin connectors that would easily damage or break.

In certain embodiments disclosed herein, a module is provided on which multiple memory components are integrally mounted. Thus, the module requires only a single placement in an interface device to program or verify multiple memory components. In some applications an adapter is provided to electrically couple the module to an interface device. In additional embodiments, a status display is associated with the BIOS device to provide status information regarding execution of the BIOS code, thereby permitting faster and more accurate diagnostics to be performed should a failure occur.

Computer Architecture

FIG. 1 is a block diagram illustrating an exemplary computer architecture for an EGM. FIG. 1 includes a baseboard 100, also known as a motherboard, system printed circuit board, carrier board, main board, etc. A number of different components can be located on the baseboard 100. In the illustrated embodiment, an embedded computer module 102 is located on the baseboard 100. In some example embodiments, the embedded computer module 102 is compliant with a COM (Computer-On-Module) Express industry standard, issued by PICMG (PCI Industrial Computer Manufacturers Group). COM Express (COMe) can be based on several serial differential-signaling technologies, including PCI Express, Serial Advanced Technology Attachment (SATA), USB 2.0, and Serial Digital Video Out (SDVO). In alternative embodiments, the embedded computer module 102 may be compliant with an ETX (Embedded Technology eXtended) Express COM specification. ETX is a PCI/ISA based COM, which offers personal computer (PC) functionality. In further embodiments, the embedded computer module 102 includes a video function, an audio function, an Ethernet function, one or more storage interfaces, and one or more data communication interfaces. Video capabilities can provide for support of dual (or more) independent displays using a single processor.

The embedded computer module 102 includes one or more processors. In this example, the embedded computer module 102 includes a processor 108. The processor 108 can include any suitable processor, such as an Intel® Core™ processor, an Intel® Core™ i5 processor, an Intel® Core™ i7 processor, or other suitable processors.

The embedded computer module 102 also includes a chipset 110. The chipset 110 can be one or more chips to provide an interface to the processor 108. In this example, the chipset 110 is communicatively coupled to the processor 108 through a bus 116 (e.g., front side bus). The chipset 110 can provide an interface to the processor 108 for main memory, graphics controllers, peripheral buses (e.g., Serial Peripheral Interface (SPI), Peripheral Component Interconnect (PCI), Industry Standard Architecture (ISA), Universal Serial Bus (USB), etc.), etc. In this example, a volatile memory 111 is positioned on the embedded computer module 102. The volatile memory 111 can be different types of Random Access Memory (RAM) (e.g., Dynamic RAM (DRAM), Static RAM (SRAM), etc.). A baseboard connector 120 may be provided on the baseboard 100 and communicatively coupled to the processor 108.

A module 122 having memory components may be detachably coupled to the baseboard 100. As best shown in FIG. 1, the module 122 may include a module board 124. A first device 126 is coupled to the module board 124 and has a first nonvolatile memory 128. A second device 130 is also coupled to the module board 124 and has a second nonvolatile memory 132. The module 122 further includes a module connector 134 coupled to the board and including a first module contact 136 communicatively coupled to the first device 126 and a second module contact 138 communicatively coupled to the second device 130.

The first and second nonvolatile memories 128, 132 may comprise an EPROM, an EEPROM, etc. In the exemplary embodiment, the first nonvolatile memory 128 is configured to store BIOS-related code. The BIOS-related code can include the system BIOS and the UBE. Both the system BIOS and the UBE are executed by the processor 108 as part of the boot up operations of the computer. The first nonvolatile memory 128 also may be configured to store a descriptor region that defines the location of the BIOS code, write protections of the data stored in the first nonvolatile memory 128, etc. In some embodiments, the first nonvolatile memory 128 is communicatively coupled to the chipset 110 through a Serial Peripheral Interface (SPI) bus 118.

In the exemplary embodiment, the second nonvolatile memory 132 is configured to store jurisdictional-related code. The jurisdictional code may include information specific to the jurisdiction where the EGM is to be installed. This information may, for example, include a lottery terminal identification (ID), a part number, a jurisdiction ID, a jurisdiction name, jurisdiction bit code options, jurisdiction maximum bet, jurisdiction maximum win, and a digital signature. The second nonvolatile memory 132 may be communicatively coupled to the chipset 110 through a separate SPI bus 119.

The module connector 134 may be configured to releasably engage the baseboard connector 120, thereby to communicatively couple the first and second nonvolatile memories 128, 132 to the processor 108. In exemplary embodiments, the module connector 134 comprises an edge-type connector, such as a peripheral component interconnect express (PCIe) connector. The use of an edge-type connector, as opposed to a pin-type connector, provides an interface with the baseboard 100 that is more sturdy and less prone to inadvertent damage as the module 122 is inserted and removed. Furthermore, the module connector 134 may be keyed to the baseboard connector 120 so that the module 122 may be inserted only in the proper orientation.

Although not shown, the baseboard 100 and the embedded computer module 102 can include other components. For example, the embedded computer module 102 can include cache, a memory controller, an I/O controller, connectors, etc. For example, in some example embodiments, the embedded computer module 102 can provide external connections for one or more PCI Express lanes, PCI Express Graphics (PEG) links, SATA links, Integrated Drive Electronics (IDE) or Parallel Advanced Technology Attachment (PATA) links, multiple Gigabit (Gbit) Ethernet ports (e.g., including 1-Gbps Ethernet and/or 10-Gbps Ethernet), USB 2.0 ports, low-voltage differential signaling (LVDS) channels, high-definition audio interfaces, channels of SDVO, analog cathode ray tube (CRT) interfaces, analog VGA interfaces, NSTC/PAL, TV-out ports (e.g., SDTV and/or HDTV), and I2C busses, and power and ground I/O, among other things.

Memory Mapping

Figure 2:
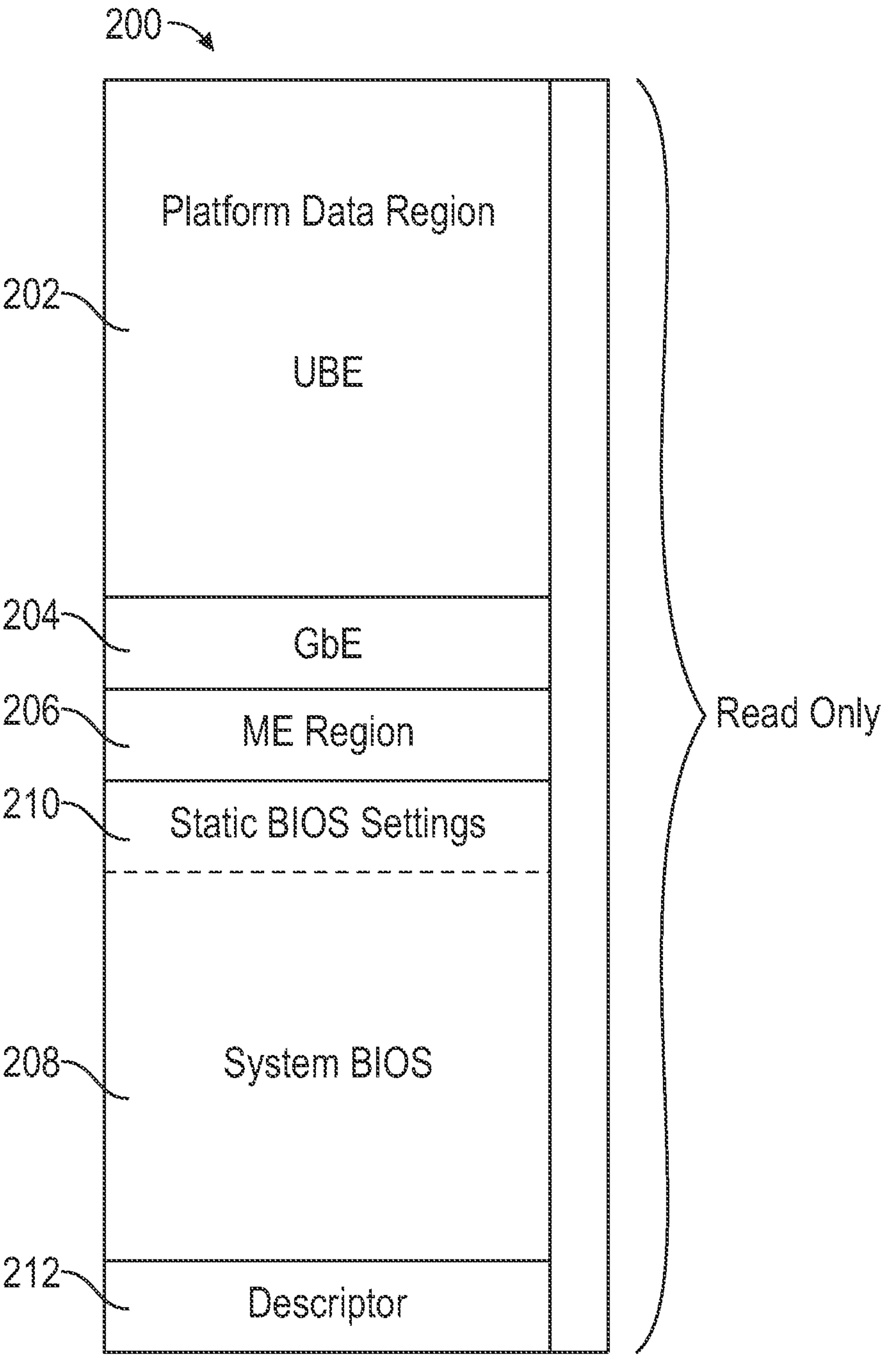
FIG. 2 is a memory map of data (including BIOS code) stored in a nonvolatile memory, according to exemplary embodiments.

FIG. 2 illustrates an exemplary embodiment of a memory map of data (including BIOS code) stored in nonvolatile memory, according to some example embodiments. FIG. 2 includes a memory map 200 for data stored in the first nonvolatile memory 128 (see FIG. 1). In particular, the data may include BIOS-related data. The memory map 200 includes a Platform Data Region (PDR) 202 configured to store the UBE code. The UBE code includes BIOS extension instructions that can provide additional functionalities beyond the system BIOS code for a particular application, machine, or other component. As described in greater detail below, the UBE code may also include code for implementing a validation process used to validate the first nonvolatile memory 128, the second nonvolatile memory 132, and other system components.

The memory map 200 also includes a Gigabit Ethernet (GbE) region 204. In some example embodiments, the GbE region 204 is zeroed out and not used.

Still further, the memory map 200 includes a management engine region 206 configured to store a management engine. The management engine comprises instructions that are loaded into the processor after the computer is initially powered on. Among other operations, the management engine initializes the chipset 110 during the boot-up and prior to completing a restart of the processor 108 (shown in FIG. 1). In some embodiments, a programmable component (not shown) within the processor 108 executes the management engine to perform its operations. In some embodiments, neither the management engine nor any other application/component modifies or updates the BIOS-related data stored in the first nonvolatile memory 128 during the boot-up.

The memory map 200 includes a system BIOS region 208 that is configured to store the system BIOS instructions. As part of the boot up operations of a computer, the processor retrieves and executes the system BIOS instructions. As part of the execution of the system BIOS instructions, the processor also retrieves and executes the UBE instructions. A portion of the system BIOS region 208 may include a BIOS settings region 210 that is configured to store the BIOS settings. The BIOS settings can comprise settings for the system date, system time, a setting for daylight savings, settings for the hard disk drives (e.g., primary master, primary slave, secondary master, secondary slave, etc.), cache, identification of the boot devices, etc.

The memory map 200 also includes a descriptor region 212 that stores descriptors defining where the system BIOS, the BIOS settings, the UBE, and the management engine are located. In this example, the descriptors would include an identification of the first nonvolatile memory 128 and addresses therein for the system BIOS region 208, the UBE (in the PDR 202), the management engine region 206, and the BIOS settings region 210. The descriptors also define the read and write privileges (e.g., read-only, read/write, etc.) for each of these regions and the descriptor region 212. In some exemplary embodiments, the PDR 202, the management engine region 206, the BIOS settings region 210, the system BIOS region 208, and the descriptor region 212. In other exemplary embodiments, these regions can have other the read and write privileges.

The UBE in the PDR 202 may be configured to generate one or more BIOS signatures. The BIOS signature is a digital signature that comprises a hash value representative of all of the data in one or more of the first nonvolatile memory 128, the second nonvolatile memory 132, and other system components. The hash value can be based on any of the Secure Hash Algorithms (SHA) (e.g., SHA-3, SHA-2, etc.), any of the Message Digest (MD) algorithms (e.g., MD-4, MD-5, etc.), etc. More than one hash value may be generated based on different algorithms, cryptographic keys, etc. to allow the authentication of the data to change over time.

A similar memory map of data may be generated for the second nonvolatile memory 132. In particular, the data may include jurisdictional code. The jurisdictional code may include information specific to the jurisdiction where the EGM is to be installed, such as a lottery terminal identification (ID), a part number, a jurisdiction ID, a jurisdiction name, jurisdiction bit code options, a jurisdiction maximum bet, and a jurisdiction maximum win. Additionally, the memory map may include a region configured to determine one or more authorized jurisdictional signatures. The jurisdictional signature may be configured similar to the BIOS signatures noted above, and therefore may be a digital signature that includes a hash value representative of all of the data in the second nonvolatile memory 132.

Validation During BIOS Operations

This section describes operations associated with some example embodiments. In the discussion below, the flowcharts are described with reference to the block diagrams presented above. However, in some example embodiments, the operations can be performed by logic not described in the block diagrams. In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 3:
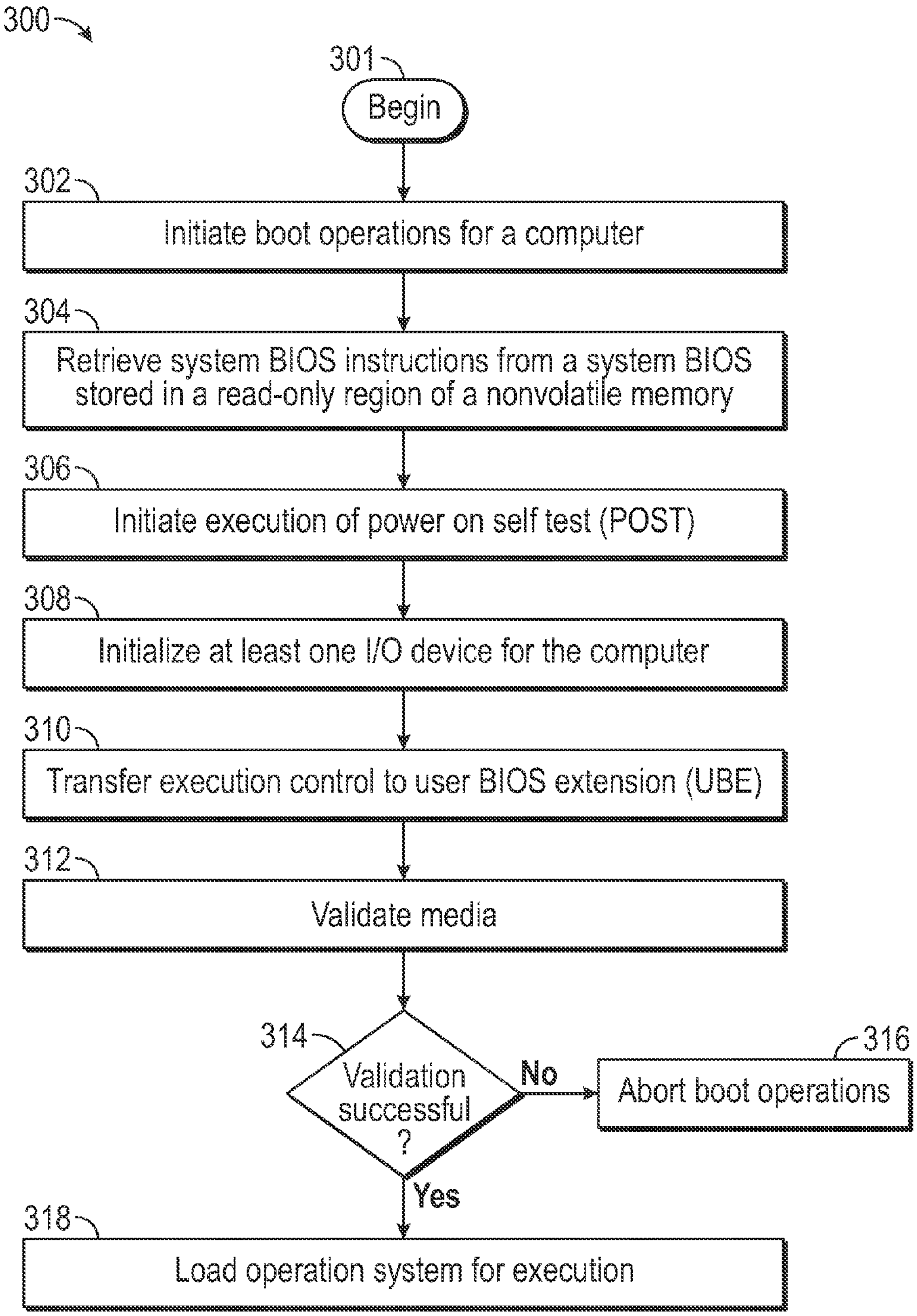
FIG. 3 is a flowchart of operations for execution of BIOS code, according to exemplary embodiments.

FIG. 3 is a flowchart 300 illustrating an exemplary embodiment of operations for execution of system BIOS code for protection and authentication of BIOS code in a computer. The flowchart 300 includes operations that, in some embodiments, are performed by components of the computer architecture shown in FIG. 1.

The flowchart may begin at block 301, such as when the system is powered on. Next, at block 302, the computer is initiated for boot operations. For example, boot operations can be initiated in response to powering on or restarting the computer.

At block 304, the processor 108 retrieves system BIOS instructions from a system BIOS stored in a read-only region of the first nonvolatile memory 128. The system BIOS instructions can be loaded into the volatile memory 111 from the first nonvolatile memory 128. As shown, the first nonvolatile memory 128 can be a SPI device, wherein communications between the first nonvolatile memory 128 and the chipset 110 are through the SPI bus 118. As noted above, the first nonvolatile memory 128 can initiate the chain of trust regarding the BIOS for the computer.

At block 306, the processor 108 initiates execution of the system BIOS instructions, including a Power-On Self-Test (POST). The POST may be a routine configured to set initial values for internal and output signals and to execute internal tests. As the POST progresses, test results may be stored and/or outputted to an external device. The test results may provide an indication of the status or progress of the POST.

At block 308, the processor 108 initializes at least one input/output (I/O) device for the computer. Examples of I/O devices include a graphics card, a hard disk drive, a communications port, a keyboard, etc. In particular, this initialization is part of the execution of the system BIOS.

At block 310, control is transferred to the UBE to execute UBE instructions. In particular, the UBE instructions are a BIOS extension that is to be executed as part of the boot-up operations. For example, the processor 108 may retrieve the UBE instructions from the UBE stored in a read-only region of the first nonvolatile memory 128. The UBE instructions can be loaded into the volatile memory 111 from the first nonvolatile memory 128. As shown, the first nonvolatile memory 128 can be a SPI device, wherein communications between the first nonvolatile memory 128 and the chipset 110 are through the SPI bus 118.

The execution of the UBE may include a number of different start up operations for the computer. For example, the UBE instructions may validate the BIOS and UBE on the first non-volatile memory 128, the jurisdiction information on the second non-volatile memory 132, the operating system, or other media. The processor 108 may retrieve the BIOS data for authentication from the first nonvolatile memory 128, which includes at least the system BIOS instructions and the UBE. In some embodiments, the processor 108 retrieves all of the data stored in the first nonvolatile memory 128.

In the exemplary embodiment illustrated at FIG. 3, the UBE includes instructions for validating media associated with the system, as shown at block 312. During validation, the processor 108 may generate a BIOS digital signature across the data retrieved for validation from the first and second nonvolatile memories 128, 132. As described above, the BIOS digital signature can be based on any number of different cryptographic algorithms (e.g., versions of SHA, MD, etc.). The processor 108 can generate the BIOS digital signature using a public key that is stored in any number of different media. For example, the public key can be stored in the first nonvolatile memory 128 (e.g., storage in descriptor region 212 or a separate region not shown in FIG. 2), volatile memory 111, etc.

Similarly, the processor 108 may generate a jurisdictional digital signature that may be separate from or incorporated into the BIOS digital signature. For example, the processor 108 may retrieve jurisdictional data for validation from the second nonvolatile memory 132 and generate a jurisdictional digital signature representative of the retrieved data.

At block 314, the UBE determines whether validation of the media is successful. Validation success may be predicated on the generated BIOS digital signature. More specifically, for example, the processor 108 may compare the generated BIOS digital signature to an authorized BIOS digital signature. Alternatively, the generated BIOS digital signature may inherently indicate that it is valid.

Regardless of the method used, if validation is unsuccessful then operations continue at block 316, where the processor 108 may abort the boot operations for the computer. In particular, the processor 108 may not allow the boot operations to continue and the computer may not start normal operations. As part of the abort, the processor 108 may perform different operations, including one or more of the following: 1) generate an error message for display on a screen of the computer, 2) generate an error message for storage in an error log stored in a nonvolatile memory of the computer, 3) power down the computer, etc.

Alternatively, if validation is successful, operations may continue at block 318 to load the operating system for execution. For example, the processor 108 may load the operating system after control is returned from execution of the UBE instructions. Loading of the operating system also may be part of the execution of the system BIOS.

Adapter for Module

In some embodiments, an adapter 150 may be provided to facilitate communicative coupling of the module 122 to a separate interface device. In the exemplary embodiment illustrated at FIG. 4, the adapter 150 may include an adapter board 152. An adapter input connector 154 may be coupled to the adapter board 152 and configured to engage the module connector 134. In embodiments where the module connector 134 is configured as a peripheral component interconnect express (PCIe) connector, the adapter input connector 154 may be configured as a PCIe compatible connector. The adapter input connector 154 may include a first adapter input contact 156 configured to engage the first module contact 136 and a second adapter input contact 158 configured to engage the second module contact 138. The adapter 150 may further include an output connector 160 configured to engage an interface connector, such as a verification connector 153 of a verification device 155. For example, the output connector 160 may be configured as a dual in-line package (DIP) connector that mates with the verification connector 153. The adapter board 152 may include circuitry for communicatively coupling in parallel the first adapter input contact 156 to the output connector 160 and the second adapter input contact 158 to the output connector 160.

Figure 4:
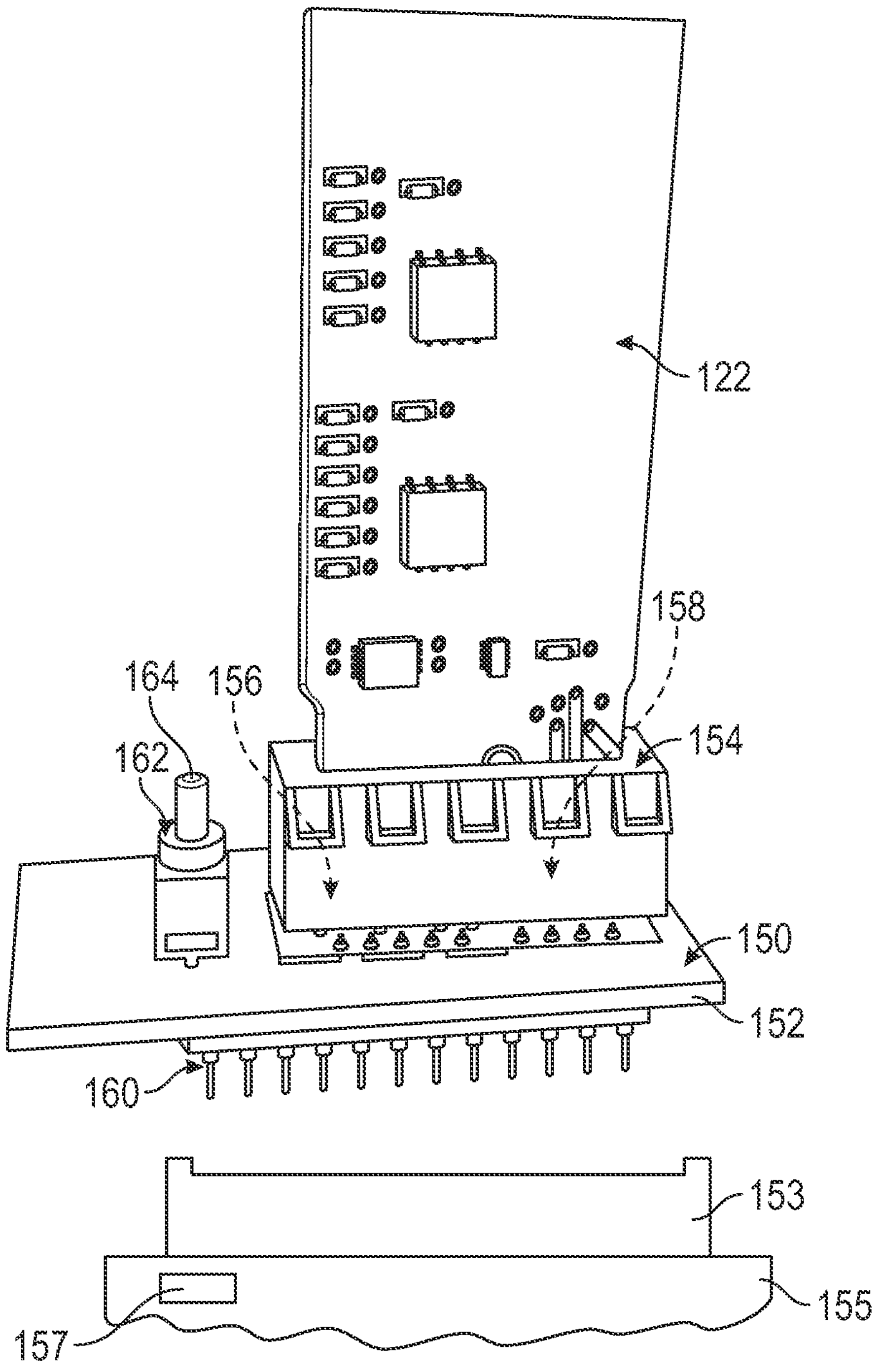
FIG. 4 is a perspective view of a module attached to an adapter, according to exemplary embodiments.

Still referring to FIG. 4, the adapter 150 includes a switch 162 for selecting which of the first and second memories 128, 132 to communicatively couple to the verification device 155. The switch 162 may be coupled to the adapter board 152 and may have different states associated with selectively coupling a selected one of the first and second adapter input contacts 156, 158 to the output connector 160. For example, the switch 162 may include an operator interface 164 capable of toggling the switch 162 between states. The operator interface 164 may have a first position, in which the first adapter input contact 156 is communicatively coupled to the output connector 160, and a second position, in which the second adapter input contact 158 is communicatively coupled to the output connector 160. It will be appreciated, therefore, that the first nonvolatile memory 128 may be validated when the switch 162 is in the first position while the second nonvolatile memory 132 may be validated when the switch 162 is in the second position, all while the module 122 remains in the same validate position.

Validation Using a Verification Device

Validation of the memory components of the EGM may be performed under various conditions. When the memory components are connected to the EGM, for example, validation may be performed by the processor 108. Alternatively, other devices may be used to validate the memory components. More specifically, the first and second nonvolatile memories 128, 132 may be removed from the baseboard and the data stored therein may be validated by a separate verification device (e.g., device manufactured by Kobetron Inc. of Navarre, Fla.). The first and second nonvolatile memories 128, 132 can be coupled to the verification device, and the verification device may then generate a digital signatures across the data stored in the first and second nonvolatile memory 128, 132 to determine if data therein is valid.

Conventionally, validation of both the first and second memories 128, 132 required entirely separate operations during which each memory 128, 132 was independently removed from the baseboard, inserted into the verification device, and then reinstalled back on the baseboard. Providing the module 122 having both the first and second devices, however, permits the first and second memories 128, 132 to be removed and reinstalled concurrently, so that validation of both memories may be performed with a single placement of the module 122 on the verification device.

Figure 5:
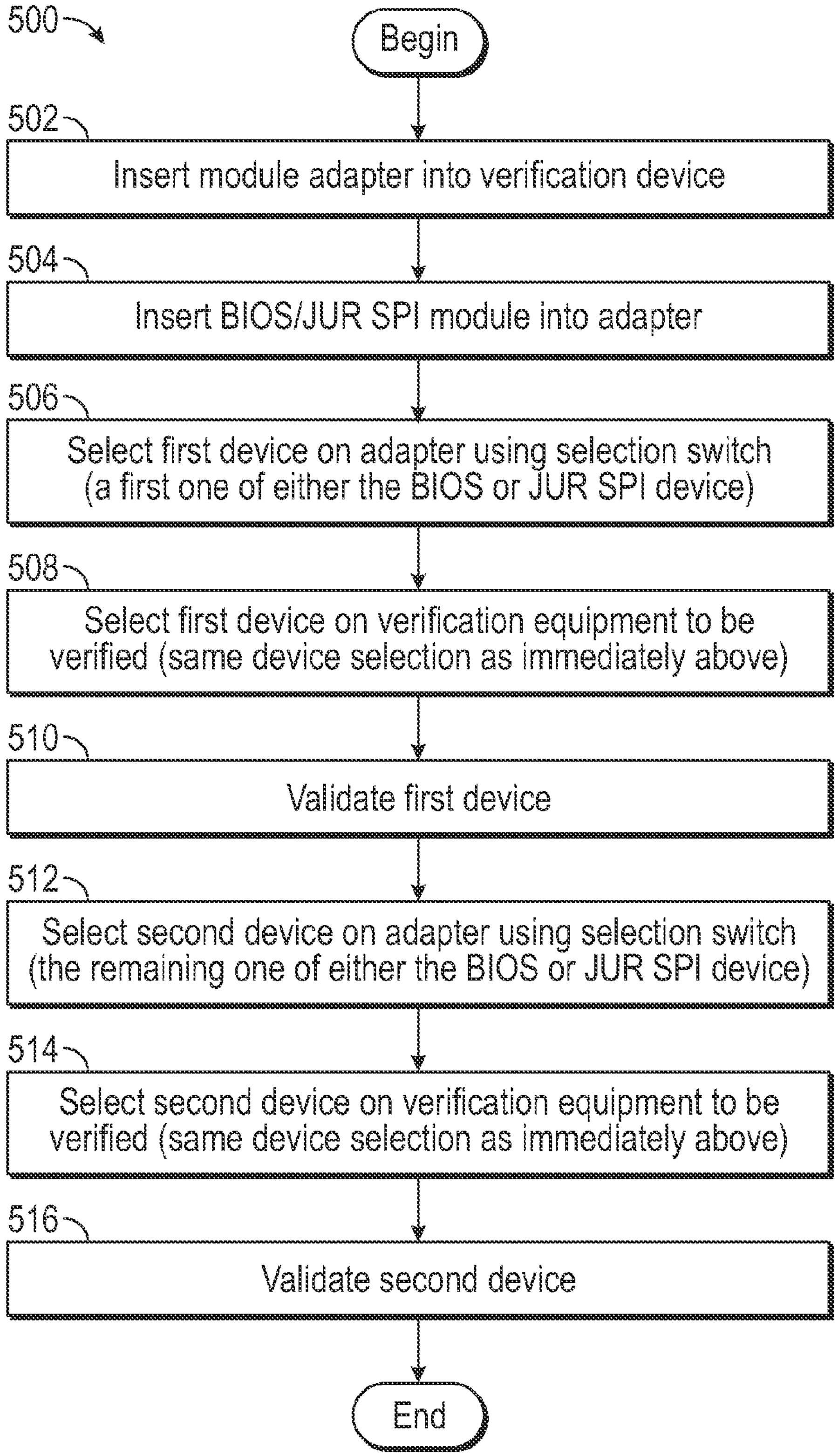
FIG. 5 is a flowchart of operations for execution of memory validation, according to exemplary embodiments.

FIG. 5 is a flowchart 500 illustrating an exemplary method of validating memory contents associated with the baseboard of the EGM. At block 502, the method begins with inserting the adapter 150 into the verification device 155. More specifically, the output connector 160 may include pins and the verification connector 153 may include a socket, wherein the pins of the output connector 160 are inserted into the socket of the verification connector 153. Next, at block 504, the module 122 is electrically coupled to the adapter 150, such as by connecting the first and second module contacts 136, 138 to the first and second adapter input contacts 156, 158.

At block 506, the operator interface 164 may be manipulated to move the switch 162 to a first position. The first position may be associated with a specific device setting, such as the first device 126. The verification device 155 may also have an operator interface 157 for selecting the type of device to be validated. At block 508, the operator interface 157 may be actuated to select the same device as was selected at block 506, which in this example is the first device 126. At block 510, the verification device 155 validates the first nonvolatile memory 128 associated with the first device 126.

Without moving the module 122, the method may continue by validating a second device. More specifically, at block 512 the operator interface 164 of the adapter 150 may be actuated to a second state associated with the second device 130. At block 514, the operator interface 157 of the verification device 155 is also actuated to select the same device as was selected in block 512, which in this example is the second device 130. At block 516, the verification device 155 validates the second nonvolatile memory 132 associated with the second device 130.

Similar process efficiencies are recognized during programming of multiple devices. During programming, the interface device may take the form of a programming device configured to program each of the memories. When using the module 122 and adapter 150 described above, the programming device may more efficiently program multiple devices. More specifically, with the adapter 150 coupled to the interface connector (such as an input connector of the programming unit) and the module 122 coupled to the adapter 150, the switch can be placed in a first state to program the first device 126 and a second state to program the second device 130 without having to move and/or replace the module 122. Accordingly, the module 122 and adapter 150 provide benefits to both read and write operations.

Figure 6A:
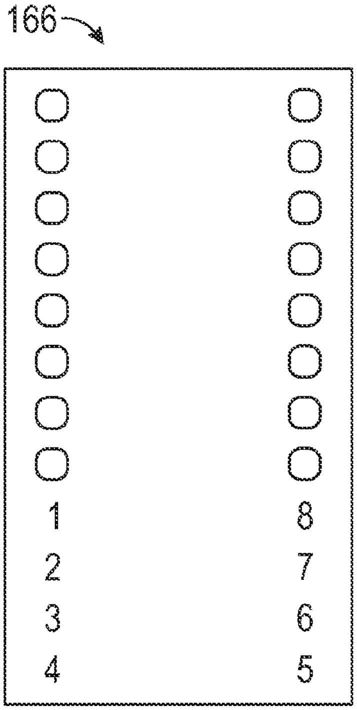
FIGS. 6A and 6B are diagrammatic illustrations device connectors that are, respectively, bottom and top justified.
Figure 6B:
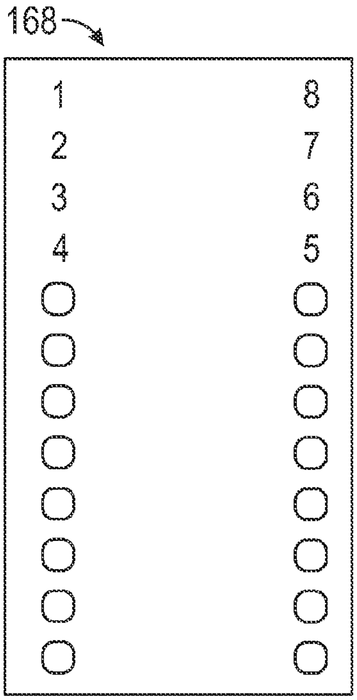

In some embodiments, the output connector 160 may include pins while the interface connector may include sockets. Different pin configurations may be used to facilitate connection to different types of interface devices. While the different interface devices may have the same overall number of sockets, they may designate different areas of sockets to be electrically active during operation. For example, as shown in FIG. 6A, a device socket 166 may have a bottom justified pin configuration, where pins 1-8 at the bottom of the socket 166 are electrically active. Alternatively, as shown in FIG. 6B, a device socket 168 may have a top justified pin configuration, where pins 1-8 at the top of the socket 168 are electrically active. The adapter 150 may have different versions, such as a first version where the output connector 160 is bottom justified for use the with device socket 166 of FIG. 6A, and a second version where the output connector 160 is top justified for use with the device socket 168 of FIG. 6B.

Module Housing

Figure 7:
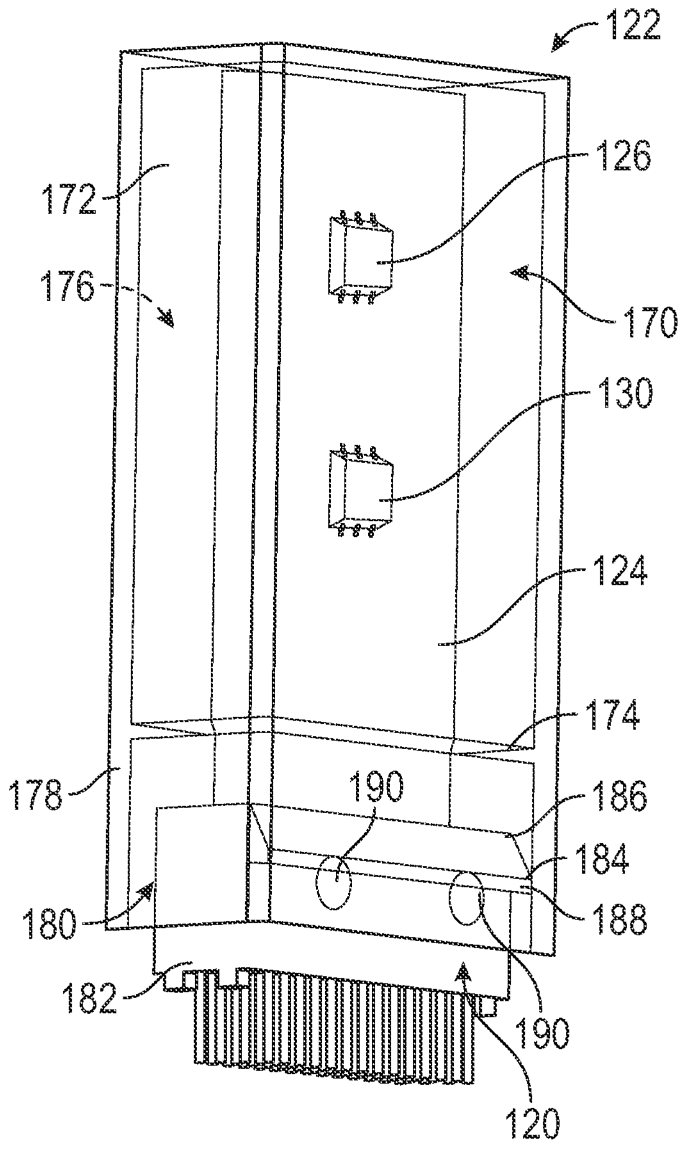
FIG. 7 is a perspective view of a module having a housing, according to exemplary embodiments.

The module 122 may further include an assembly housing 170. As best shown in FIG. 7, the assembly housing 170 may include a base housing portion 172 configured to enclose a portion of the module board 124 carrying the first and second devices 126, 130. An intermediate wall 174 may extend inwardly from the base housing portion 172 to engage the module board 124, thereby to form a housing chamber 176. The assembly housing 170 may further include a shroud portion 178 extending from the base housing portion 172 to form a housing receptacle 180. A proximal edge of the module board 124 carrying the module connector 134 is disposed in the housing receptacle 180, so that the shroud portion 178 may prevent dust from reaching the module connector 134 when attached to a mating connector. In some embodiments, the housing 170 may be formed of multiple parts, such as two halves, that are joined together around the module board 124. Other embodiments may use an overmolding process, in which the housing 170 is molded over the module board 124, thereby to provide a unitary housing having improved durability.

In some embodiments, the assembly housing 170 further may be configured to provide sensory feedback when the module 122 is fully seated on either the baseboard connector 120 or the interface connector. As best shown in FIG. 7, the baseboard connector 120 may be provided as a baseboard socket having a socket housing 182 that includes an outwardly projecting lip 184 formed by a ramp surface 186 and a retaining surface 188. The shroud portion 178 of the assembly housing 170 may include an inwardly extending projection 190 configured to releasably engage the lip 184. More specifically, the projection 190 may have a rounded or other profile that allows it to slide across the ramp surface 186 as the module 122 is coupled to the baseboard connector 120. The projection 190 may be positioned so that it slides past the ramp surface 186 to engage the retaining surface 188 when the module connector 134 is fully seated on the baseboard connector 120. As the projection moves inwardly, it may provide a tactile, audible, or other signal indicating that it has advanced past the ramp surface 186 to engage the retaining surface 188 and therefore the module connector 134 is fully seated. This may be advantageous for installations where the operator does not have a direct line of sight to the baseboard connector 120, and therefore will receive feedback when the module 122 is properly installed. The profile of the projection 190 may further deflect the shroud portion 178 outwardly in response to a sufficient removal force being applied to the module 122, thereby to permit the module 122 to be detached from the baseboard connector 120. While the exemplary embodiment of FIG. 7 shows the assembly housing 170 having two projections 190, a single projection or more than two projections may be used.

The assembly housing 170 may be formed of a transparent material to permit viewing of the module board 124 and the components mounted thereon. Additionally, the exterior surface of the assembly housing 170 may include relatively large, substantially planar surfaces for accepting labels or other identification marks to be applied to the module 122. The label may indicate what version of the BIOS and jurisdictional devices are installed on the module board 124 and provide other version or region specific information regarding the contents of the module 122.

BIOS Status Indicator

In some embodiments, the module 122 may include a status indicator 800 for displaying status information associated with operation of the BIOS code in the first nonvolatile memory 128. In the exemplary embodiment illustrated at FIG. 8, the status indicator 800 includes a series of status displays in the form of light emitting diodes (LEDs) that are illuminated in a predetermined sequence to provide a status of the BIOS operation.

More specifically, a first LED 802 may be configured to illuminate when the module 122 is operatively coupled to a power source. During installation or service operations, the first LED 802 will provide an indication that the module 122 has been properly installed onto a baseboard or other connector.

A second LED 804 may be configured to illuminate when a power-on self-test has started. During the boot up process the BIOS may generate power-on self-test (POST) codes which represent checkpoints that have been reached during execution of the system BIOS. Accordingly, the second LED 804 may indicate that the POST has initiated.

A third LED 806 may be configured to illuminate when the POST has completed. When the POST is successfully finished, the system BIOS transfers control to the UBE. The point at which control is transferred from the system BIOS to the UBE may coincide with the completion of the POST, and therefore illumination of the third LED 806 may also indicate that the POST has successfully completed.

A fourth LED 808 may be configured to illuminate when validation has passed. As noted above, during validation one or more digital signatures may be generated and determined whether they pass. In this exemplary embodiment, if the generated digital signature passes, the fourth LED 808 will be illuminated.

The use of status displays provides feedback that can be used during programming and/or validation of the first nonvolatile memory 128. Illumination of the status displays provides status information that a technician may use when diagnosing root causes for faulty components, thereby expediting service calls and reducing the number of components that may be misdiagnosed as faulty.

Module Auxiliary Components

Figure 8:
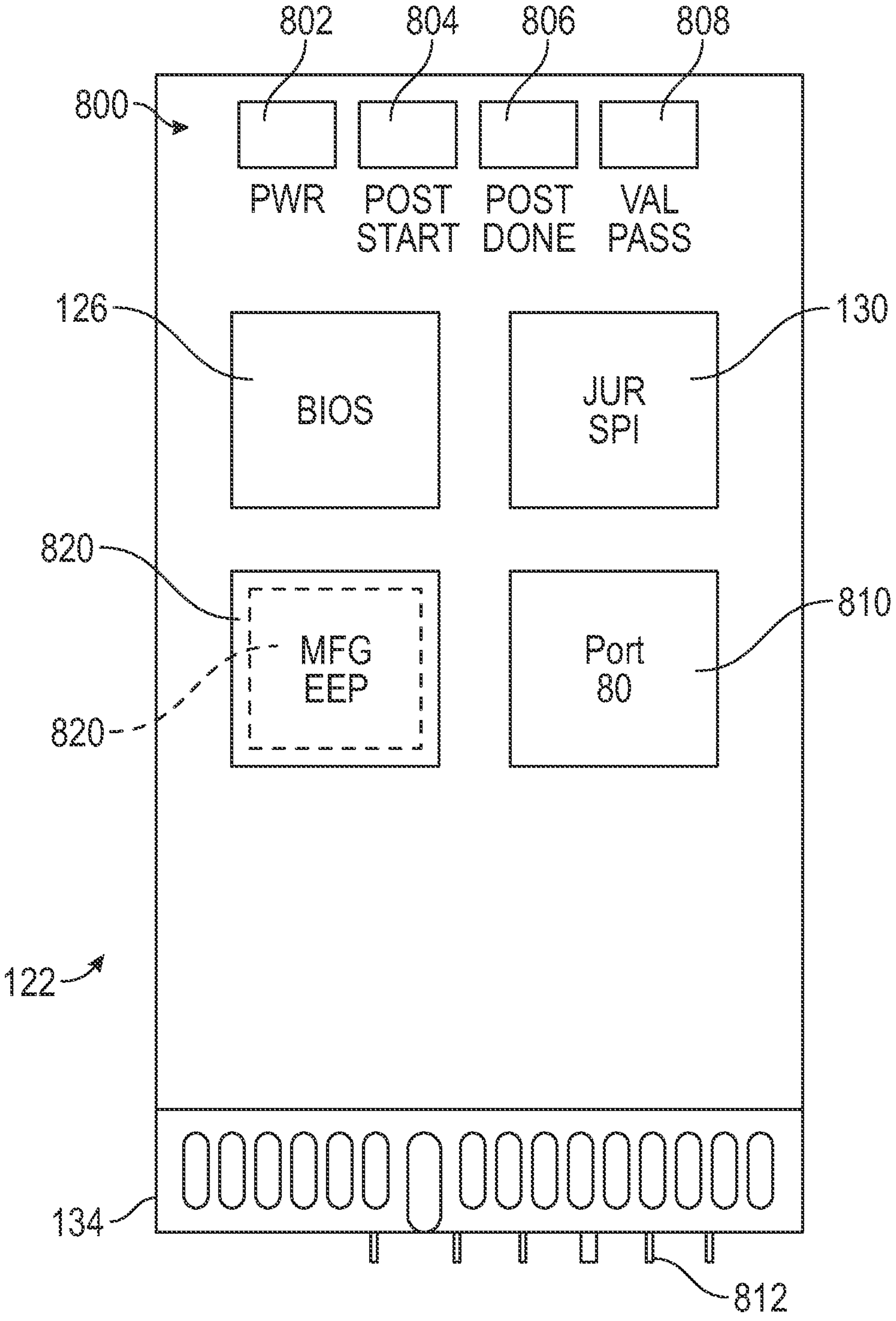
FIG. 8 is a diagrammatic illustration of a module having a status indicator, according to exemplary embodiments.

The module 122 may include additional auxiliary components to expand the functionality of the module 122. As best shown in FIG. 8, for example, the module 122 may include a POST code device 810 coupled to the module board 124. The POST code device 810 may include a header (such as a port 80 header) that is communicatively coupled to a third module contact 812 of the module connector 134. The third module contact 812, in turn, may be communicatively coupled to a low pin count (LPC) bus 814 (FIG. 1) to which POST checkpoint codes are provided during BIOS execution. A POST code display device (not shown) may be coupled to the POST code device 810 to access and review the POST checkpoint codes, thereby to help identify the status of the BIOS process.

Additionally, the module 122 may include a programmable storage device 820 coupled to the module board 124 for use during manufacturing. The programmable storage device 820, such as an EEPROM device, may include a third nonvolatile memory 822 configured to collect and store manufacturing data. The manufacturing data may include test history data, checkpoints and date stamps associated with processor failures, configuration information associated with the module 122, or other information.

Electronic Gaming Machine Architecture

Figure 9:
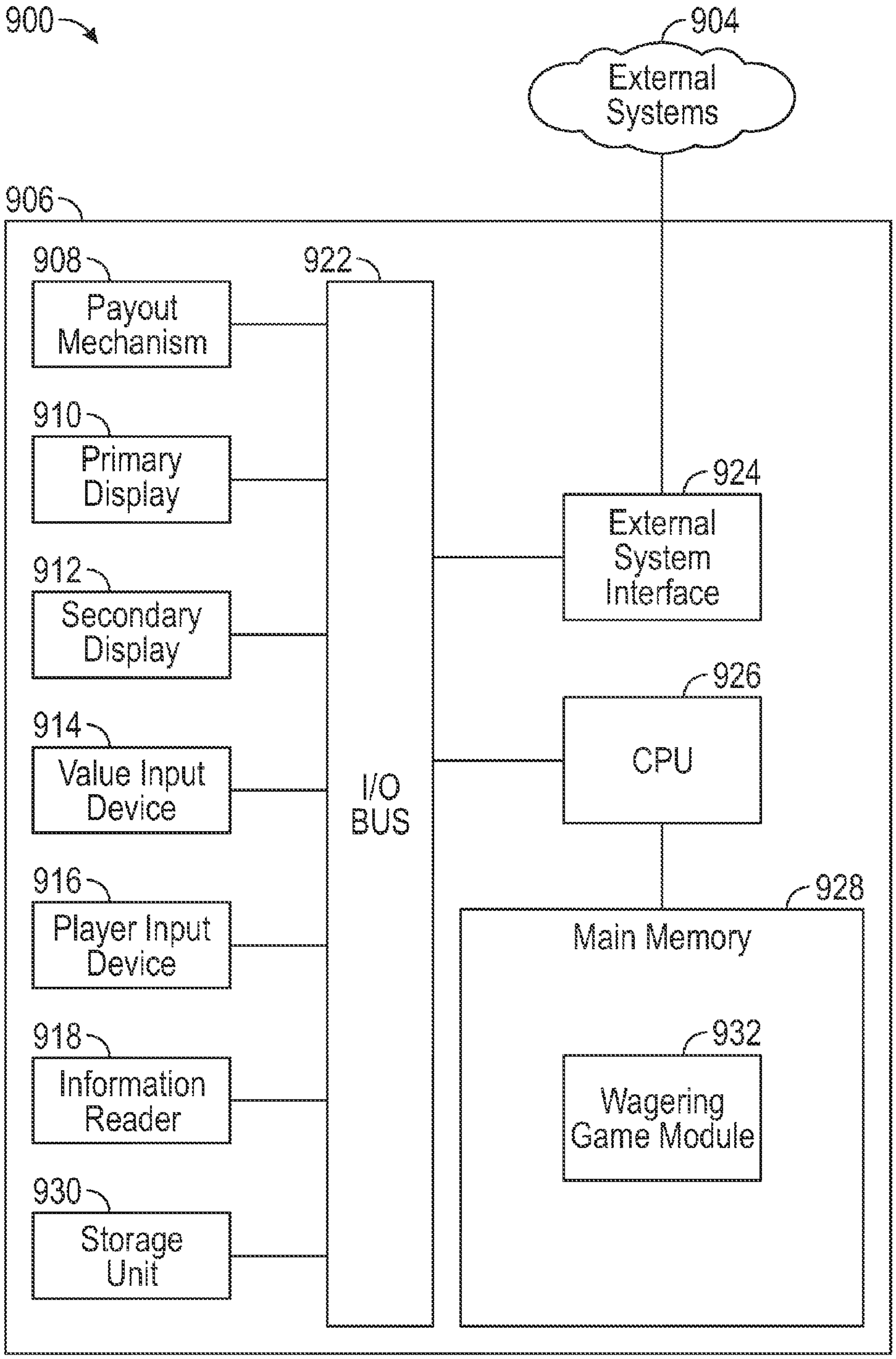
FIG. 9 is a bock diagram illustrating an EGM architecture, according to exemplary embodiments.

FIG. 9 is a block diagram illustrating an EGM architecture, according to exemplary embodiments of the invention. As shown in FIG. 9, the EGM architecture 900 includes an EGM 906, which includes a central processing unit (CPU) 926 connected to main memory 928. The CPU 926 can include any suitable processor, such as an Intel® Core™ i3 processor, an Intel® Core™ i5 processor, an Intel® Core™ i7 processor, an Intel Pentium processor, Intel Core 2 Duo processor, AMD Opteron™ processor, or UltraSPARC processor. The main memory 928 includes a wagering game module 932. In one embodiment, the wagering game module 932 can present wagering games, such as video poker, video blackjack, video slots, video lottery, etc., in whole or part.

The CPU 926 is also connected to an input/output (I/O) bus 922, which can include any suitable bus technologies, such as an AGTL+frontside bus and a PCI backside bus. The I/O bus 922 is connected to a payout mechanism 908, primary display 910, secondary display 912, value input device 914, player input device 916, information reader 918, and storage unit 930. The player input device 916 can include the value input device 914 to the extent the player input device 916 is used to place wagers. The I/O bus 922 is also connected to an external system interface 924, which is connected to external systems 904 (e.g., wagering game networks).

In some embodiments, the EGM 906 can include the components described in FIG. 1. In such embodiments, the processor 926 and other components can reside on a COMe board, as described above. Furthermore, the EGM 906 can perform the operations described above.

In one embodiment, the EGM 906 can include additional peripheral devices and/or more than one of each component shown in FIG. 9. For example, in one embodiment, the EGM 906 can include multiple external system interfaces 924 and/or multiple CPUs 926. In one embodiment, any of the components can be integrated or subdivided.

Any component of the architecture 900 can include hardware, firmware, and/or machine-readable storage media including instructions for performing the operations described herein. Machine-readable storage media includes any mechanism that stores and provides information in a form readable by a machine (e.g., an EGM, computer, etc.). For example, machine-readable storage media may include read only memory (ROM), random access memory (RAM), magnetic disk storage media, solid state storage media, optical storage media, flash memory machines, and the like.

Exemplary Electronic Gaming Machine

Figure 10:
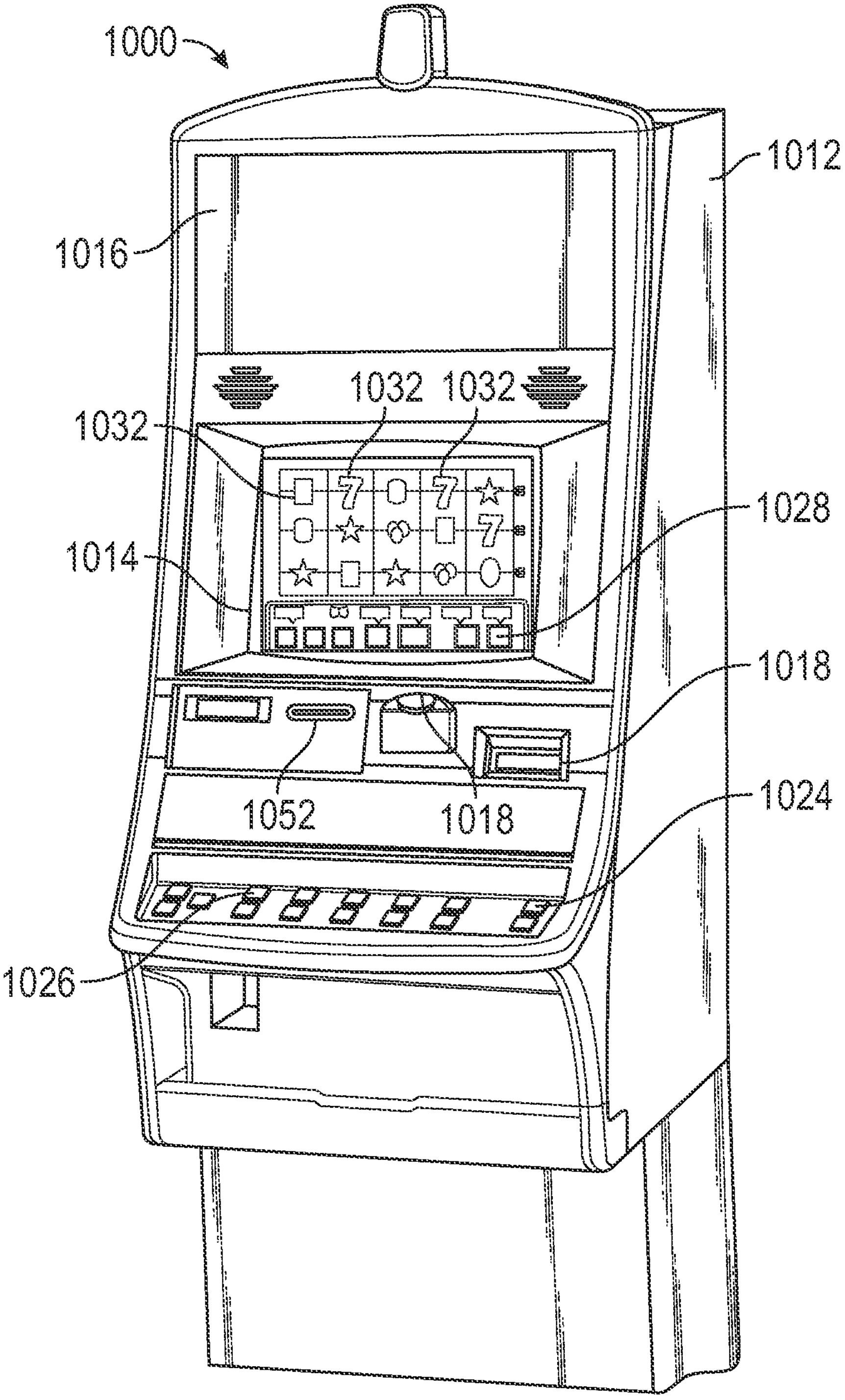
FIG. 10 is a perspective view of an EGM, according to exemplary embodiments.

FIG. 10 is a perspective view of an EGM, according to example embodiments of the invention. Referring to FIG. 10, an EGM 1000 is used in gaming establishments, such as casinos. The EGM 1000 can be any type of EGM and can have varying structures and methods of operation. For example, the EGM 1000 can be an electromechanical machine configured to play mechanical slots, or it can be configured to play video casino games, such as blackjack, slots, keno, poker, blackjack, roulette, etc.

The EGM 1000 comprises a housing 1012 and includes input devices, including value input devices 1018 and a player input device 1024. For output, the EGM 1000 includes a primary display 1014 for displaying information about a basic wagering game. The primary display 1014 can also display information about a bonus wagering game and a progressive wagering game. The EGM 1000 also includes a secondary display 1016 for displaying wagering game events, wagering game outcomes, and/or signage information. While some components of the EGM 1000 are described herein, numerous other elements can exist and can be used in any number or combination to create varying forms of the EGM 1000.

The value input devices 1018 can take any suitable form and can be located on the front of the housing 1012. The value input devices 1018 can receive currency and/or credits inserted by a player. The value input devices 1018 can include coin acceptors for receiving coin currency and bill acceptors for receiving paper currency. Furthermore, the value input devices 1018 can include ticket readers or barcode scanners for reading information stored on vouchers, cards, or other tangible portable storage devices. The vouchers or cards can authorize access to central accounts, which can transfer money to the EGM 1000.

The player input device 1024 comprises a plurality of push buttons on a button panel 1026 for operating the EGM 1000. In addition, or alternatively, the player input device 1024 can comprise a touch screen 1028 mounted over the primary display 1014 and/or secondary display 1016.

The various components of the EGM 1000 can be connected directly to, or contained within, the housing 1012. Alternatively, some of the EGM's components can be located outside of the housing 1012, while being communicatively coupled with the EGM 1000 using any suitable wired or wireless communication technology.

The operation of the basic wagering game can be displayed to the player on the primary display 1014. The primary display 1014 can also display a bonus game associated with the basic wagering game. The primary display 1014 can include a cathode ray tube (CRT), a high resolution liquid crystal display (LCD), a plasma display, light emitting diodes (LEDs), or any other type of display suitable for use in the EGM 1000. Alternatively, the primary display 1014 can include a number of mechanical reels to display the outcome. In FIG. 10, the EGM 1000 is an "upright" version in which the primary display 1014 is oriented vertically relative to the player. Alternatively, the EGM can be a "slant-top" version in which the primary display 1014 is slanted at about a thirty-degree angle toward the player of the EGM 1000. In yet another embodiment, the EGM 1000 can exhibit any suitable form factor, such as a free standing model, bartop model, mobile handheld model, or workstation console model.

A player begins playing a basic wagering game by making a wager via the value input device 1018. The player can initiate play by using the player input device's buttons or touch screen 1028. The basic game can include arranging a plurality of symbols along a payline 1032, which indicates one or more outcomes of the basic game. Such outcomes can be randomly selected in response to player input. At least one of the outcomes, which can include any variation or combination of symbols, can trigger a bonus game.

In some embodiments, the EGM 1000 can also include an information reader 1052, which can include a card reader, ticket reader, bar code scanner, RFID transceiver, or computer readable storage medium interface. In some embodiments, the information reader 1052 can be used to award complimentary services, restore game assets, track player habits, etc.

The embodiments disclosed herein, and obvious variations thereof, are contemplated as falling within the spirit and scope of the present disclosure as defined and set forth in the following claims. Moreover, the present concepts expressly include any and all combinations and subcombinations of the preceding elements and aspects.

What is claimed is:

1. A method of interfacing memory contents associated with an electronic gaming machine with an interface device, the method comprising:

coupling an adapter to the interface device, the adapter including an adapter switch having at least a first state and a second state;

coupling a module to the adapter, the module including a first device having a first memory for storing a first set of data associated with the electronic gaming machine, the first set of data comprising basic input output system (BIOS) code, and a second device having a second memory for storing a second set of data associated with the electronic gaming machine, the second set of data comprising second, different code;

placing the adapter switch in the first state to communicatively couple the first device to the interface device;

accessing the first memory using the interface device;

placing the adapter switch in the second state to communicatively couple the second device to the interface device; and accessing the second memory using the interface device.

2. The method of claim 1, in which the second set of data comprises jurisdictional code.

3. The method of claim 1, further comprising, before coupling the module to the adapter, detaching the module from a baseboard of the electronic gaming machine.

4. The method of claim 3, further comprising, after accessing the second memory using the interface device:

detaching the module from the interface device; and coupling the module to the baseboard so that the first and second memories are communicatively coupled to a processor of the electronic gaming machine.

5. The method of claim 1, in which the interface device comprises a verification device, in which accessing the first memory comprises validating the first memory, and in which accessing the second memory comprises validating the second memory.

6. The method of claim 1, in which the interface device comprises a programming device, in which accessing the first memory comprises programming the first memory, and in which accessing the second memory comprises programming the second memory.

7. The method of claim 1, further comprising, during accessing the first memory, determining status information associated with the first memory.

8. The method of claim 7, in which the status information comprises checkpoint codes, the method further comprising accessing the checkpoint codes through a code display device provided on the module.

9. The method of claim 1, in which the module includes a third device having a third memory for storing a third set of data associated with the electronic gaming machine, the method further comprising storing operational data on the third memory.

10. A module accessible by an interface device and having memory contents associated with an electronic gaming machine configured to execute a wagering game, the module comprising:

a module board;

a first device coupled to the module board and having a first memory configured to store a first set of data associated with the wagering game, the first set of data comprising basic input output system (BIOS) code;

a second device coupled to the module board and having a second memory configured to store a second set of data associated with the wagering game, the second set of data comprising second, different code; and a module connector coupled to the module board and configured for removable coupling to the interface device, the module connector having a first module contact communicatively coupled to the first device and a second module contact communicatively coupled to the second device.

11. The module of claim 10, in which the second set of data comprises jurisdictional code.

12. The module of claim 10, in which the module further comprises a status indicator operably coupled to the first memory and configured to display status information associated with the first memory.

13. The module of claim 12, in which the status indicator comprises a first status display configured to indicate that the module is coupled to a power source, a second status display configured to indicate that the first memory has initiated a power on self test (POST) associated with the BIOS code, a third status display configured to indicate that the first memory has completed the POST, and a fourth status display configured to indicate that a memory validation has passed.

14. The module of claim 10, in which the BIOS code includes a power on self test (POST) which generates checkpoint codes indicating BIOS execution status, and in which the module further includes a POST code display module coupled to the module board and configured to access the checkpoint codes.

15. The module of claim 10, in which the module further comprises a manufacturing device coupled to the module board and having a third memory.

16. A module assembly for coupling an interface device having an interface connector to memory contents associated with a baseboard of an electronic gaming machine, the electronic gaming machine having a processor communicatively coupled to a baseboard connector, the module assembly comprising:

a module including:

a module board;

a first device coupled to the module board and having a first memory configured to store a first set of data associated with the electronic gaming machine, the first set of data comprising basic input output system (BIOS) code;

a second device coupled to the module board and having a second memory configured to store a second set of data associated with the electronic gaming machine, the second set of data comprising second, different code;

a module connector coupled to the module board and configured for removable attachment to the baseboard connector, the module connector having a first module contact communicatively coupled to the first device and a second module contact communicatively coupled to the second device; and an adapter including:

an adapter input connector configured to engage the module connector and including a first adapter input contact configured to engage the first module contact and a second adapter input contact configured to engage the second module contact; and an adapter output connector configured to engage the interface connector; and a switch having a first position, in which the first adapter input contact is communicatively coupled to the output connector, and a second position, in which the second adapter input contact is communicatively coupled to the output connector.

17. The module assembly of claim 16, in which the second set of data comprises jurisdictional code.

18. The module assembly of claim 16, in which the module further comprises a status indicator operably coupled to the first memory and configured to display status information associated with the first memory.

19. The module assembly of claim 18, in which the status indicator comprises a first status display configured to indicate that the module is coupled to a power source, a second status display configured to indicate that the first memory has initiated a power on self test (POST) associated with the BIOS code, a third status display configured to indicate that the first memory has completed the POST, and a fourth status display configured to indicate that a memory validation has passed.

20. The module assembly of claim 16, in which the BIOS code includes a power on self test (POST) which generates checkpoint codes indicating BIOS execution status, and in which the module further includes a POST code display module coupled to the module board and configured to access the checkpoint codes.

* * * * *